Nov. 20, 1962  H. T. AUSTIN  3,065,009
TWIST-LOCK ROD COUPLING
Filed Nov. 16, 1961
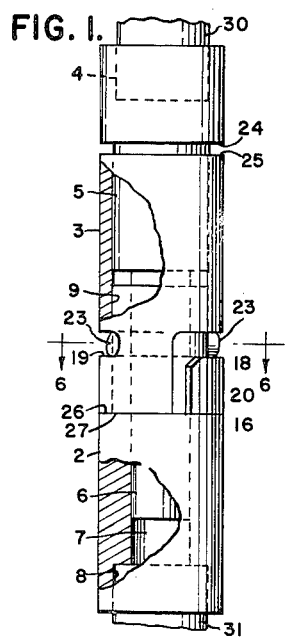
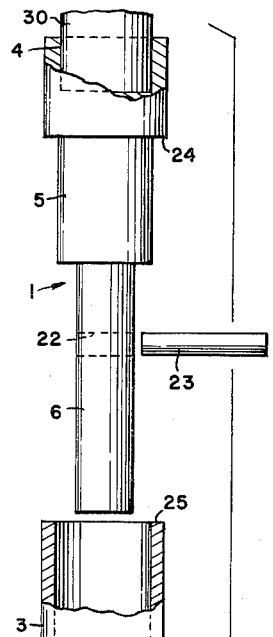
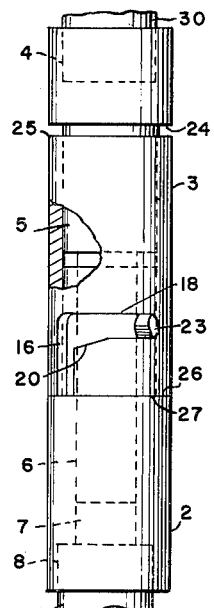
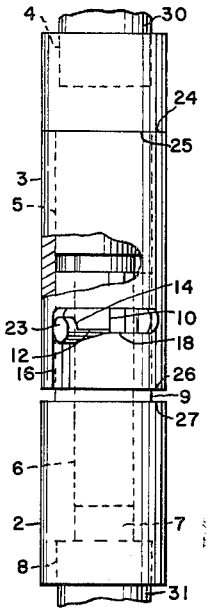
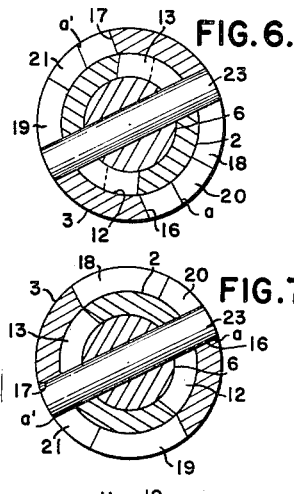
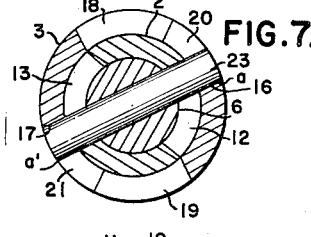
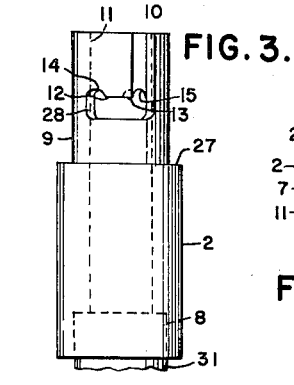
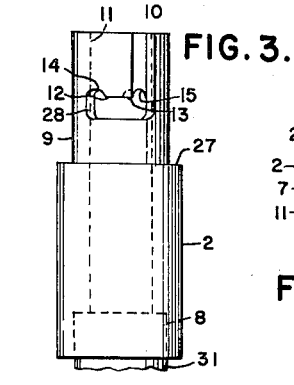
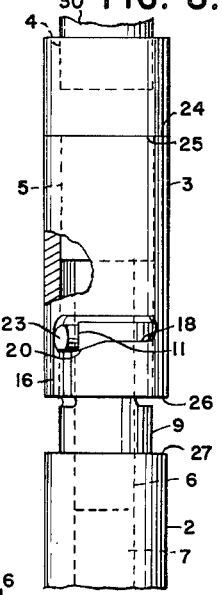
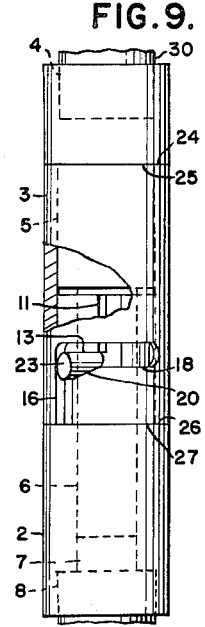
INVENTOR
HAROLD T. AUSTIN
ATTORNEY United States Patent Office 3,065,009
Patented Nov. 20, 1962

3,065,009
TWIST-LOCK ROD COUPLING
Harold T. Austin, 7801 Shore Drive, Rockford, Ill.
Filed Nov. 16, 1961, Ser. No. 152,952
4 Claims. (Cl. 287—103)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This invention relates to a novel rod coupling. More particularly, the invention relates to a twist-lock rod coupling.

In connection with the storing of grain in bins, it is necessary to take samples from various points in the mass of grain to determine the uniformity of quality of the stored material. In addition, where the grain is to be stored for extensive periods, it is necessary to take samples at regular intervals to see if any spoilage has occurred.

In taking samples of grain from bins it is the practice to use a probe secured to the end of a long rod. These bins are frequently quite large and it is therefore necessary to provide the probe with a rod sufficiently long to reach any desired point in the bin. Since a single rod long enough for this purpose would not only be too unwieldy and too heavy to handle conveniently, but would also create storage problems, it is desirable that the probe be attached to a reasonably short rod and that means be provided to add extensions so that a rod or handle of any required length can be obtained. While it is possible for this purpose to use a simple threaded sleeve coupling or pipe union, a coupling for the present purpose should be capable of rapid engagement or disengagement and should also remain securely locked to prevent accidental disengagement while in use to prevent loss of the probe.

Accordingly, one object of this invention is to provide a coupling which can be readily engaged and disengaged. Another object is to provide a coupling which when engaged will not readily open by accident. Other objects will be apparent to those skilled in the art from the description of the invention which follows.

In general, the device of this invention comprises a double bayonet-type coupling in which a pin secured in a male member engages a pair of diametrically opposed slots in a female member and further comprises a cylindrical sleeve having a pair of diametrically opposed slots, but cut in a direction opposite to those in the female member, covering both the male and femal members, the slots in the sleeve also engaging the pin in the male member.

In order that the invention may be fully understood, reference is made to the following description and to the accompanying drawings in which FIGURE 1 is an elevation and shows the coupling, partly in section, completely assembled;

FIGURE 2 is an exploded view, also partly in section, of the components of the coupling;

FIGURE 3 in an elevation of the female member, showing the location and direction of the slots;

FIGURE 4 is an end view of the female member viewed from line 4—4 in FIGURE 2;

FIGURE 5 is an end view of the cylindrical sleeve viewed on line 5—5 in FIGURE 2;

FIGURE 6 is a section, on an enlarged scale, through the pin taken on line 6—6 in FIGURE 1 showing the relative locations of the several slots and the pin when the coupling is in the locked position;

FIGURE 7 is a section, on an enlarged scale, also taken on line 6—6 in FIGURE 1, through the same parts of the assembled coupling, with the sleeve member rotated counterclockise to the unlocked position; and FIGURES 8, 9, 10, and 11 are elevations, partly in section, of the coupling in progressive stages from fully open to the locked position, respectively.

In detail, referring to FIGURE 2, the coupling comprises a male member, designated generally as 1, a cylindrical female member 2, and a cylindrical sleeve member 3.

Male member 1 is provided at one end with a cylindrical hole 4 for receiving the end of a rod 30. The rod may be secured in hole 4 by any suitable method, as by welding. The male member is provided further with a reduced portion 5 whose outside diameter is of such dimensions as the rotate freely inside cylindrical sleeve 3. Member 1 is also provided with an extension constituting reduced portion 6 of sufficient length to extend into the cylindrical passageway 7 of member 2. The inside diameter of passageway 7 is sufficiently larger than the outside diameter of extension 6 to permit the member 2 to rotate freely. The latter is also provided with an enlarged cylindrical hole 8, similar to hole 4 in member 1, to accommodate a rod 31.

Member 2 is further provided with an extension 9 of reduced diameter. This extension has cut in it a pair of diametrically opposed axial slots 10 and 11, each axial slot having extending at right angles from it, at its lower extremity, a circumferential slot 12 and 13, respectively. As shown in the several figures, the circumferential slots 12 and 13 both extend in a clockwise direction from the bottom of axial slots 10 and 11, respectively. At their inner extremity, each circumferential slot 12 and 13 is provided with recessed circular slot extensions 14 and 15, respectively.

Sleeve member 3, as already indicated, is cylindrical. Its inside diameter is substantially the same as that of the reduced extension 5 of member 1, and also of the outside diameter of reduced extension 9 of member 2, being only sufficiently larger to permit easy rotation.

Sleeve 3 is provided with a pair of diametrically opposed axial slots 16 and 17 and extending from the bottom of these slots, in a counterclockwise direction as shown in the several figures, there is a pair of circumferential slots 18 and 19, respectively. At the intersections of slots 16 and 18 and 17 and 19, the corners are cut off to provide inclined planes 20 and 21 which function as cams, as will be explained below.

Finally, elongated extension 6 on member 1 is provided with a diametrical hole 22 in which is secured a pin 23. This pin extends equidistantly on both sides of extension 6 and is preferably the same length as the outside diameter of sleeve member 3. The diameter of pin 23 is substantially the same as the widths of the slots in members 2 and 3, being just sufficiently smaller than the latter to permit easy movement in these slots.

In fabricating the device, the sleeve member 3 is first slipped over male member 1 until hole 22 in extension 6 is in register with slots 18 and 19 in sleeve member 3 and pin 23 is then driven into hole 22. The diameter of the pin is such that, after being driven into the hole, it remains securely therein.

In use, member 2 is secured to the end of one rod 31 and member 1 is secured to the end of another rod 30, as already explained.

To connect the rods, the rod to which member 1 is secured is held in one hand so that member 1 cannot rotate. Sleeve member 3 is rotated as far as possible in a counterclockwise direction until pin 23 rests against the side of slots 16 and 17. This is the position shown in FIGURE 7 and is the starting position for the coupling operation. In this position, shoulder 24 of member 1 rests on the end 25 of sleeve member 3, as shown in FIGURE 8, and pin 23 rests somewhat below the upper edges of circumferential slots 18 and 19.

With members 1 and 3 in the positions just decribed, member 2 is slipped into sleeve member 3 so that axial slots 10 and 11 of member 2 slide over pin 23. FIGURE 8 shows this step before member 2 has been inserted as far as it will go. To complete this step, member 2 is completely inserted until the lower edge 26 of sleeve member 3 rests on shoulder 27 of member 2, and pin 23 rests at the bottom of axial slots 10 and 11 of member 2. Member 2 is then rotated counterclockwise. FIGURE 9 shows the relative positions of the members when the far ends 28 and 29 of circumferential slots 12 and 13, respectively, have just come to rest against pin 23.

The next stage comprises pulling member 2 slightly outward until pin 23 rests in circular slot extensions 14 and 15 of circumferential slots 12 and 13, respectively, of member 2. This position is shown in FIGURE 10. At this point, as shown in FIGURE 10, end 26 of sleeve member 3 is slightly separated from shoulder 27 of member 2. Continuing the counterclockwise rotation of member 2 now causes the closed ends 28 and 29 of slots 12 and 13 to pull pin 23 along with them, imparting a counterclockwise rotation to member 1. At the same time, pin 23 slides upward on the two inclined surfaces 20 and 21 into circumferential slots 18 and 19 of sleeve member 3. Rotation stops when the pin comes to bear against the far ends of slots 18 and 19 and the coupling is now in the fully locked position shown in FIGURE 11.

When pin 23 falls into circular slot extensions 14 and 15, members 1 and 2 are locked, and rotation with respect to each other is not possible. However, in the stage illustrated by FIGURE 10, the pin is not secure in this position because the depth of slots 16 and 17 is such that the lower edges a and a' of inclined surfaces 20 and 21, respectively, are positioned adjacent the lower surface of slots 12 and 13 of member 2, thus permitting pin 23 to drop down out of slot extensions 14 and 15. As sleeve 3 rotates clockwise or, which is equivalent, member 2 rotates counterclockwise, the pin is forced upwardly on inclined surfaces 20 and 21 until it reaches the level of the lower surfaces of slots 18 and 19, and is seated in slot extensions 14 and 15. Since the distance between the top of the slot extensions and the lower surfaces of slots 18 and 19 is substantially the diameter of the pin, the latter cannot drop out of the extensions and relative movement between members 1 and 2 is not possible. Slots 18 and 19 are made long enough so that, even if some rotation of sleeve member 3 takes place while the coupling is in use, there is little danger that the sleeve will accidently rotate sufficiently in a counterclockwise direction to permit the pin to be disengaged from slot extensions 14 and 15. As long as the only forces applied to the coupling are substantially twisting forces between members 1 and 2, rotation of these two members relative to each other is not possible. Thus, it is possible to couple two rods and use them without danger of separation.

To uncouple the rods, it is merely necessary to hold one or the other of them, or the coupling member to which they are attached, and rotate sleeve member 3 in a counterclockwise direction as far as it will go, that is, to reverse the coupling procedure described above. When the axial slots in members 2 and 3 are in alignment, member 2 can be slipped off extension 6 of member 1 and the uncoupling operation is completed.

The coupling or locking procedure was described above in detailed steps to explain the function of the several parts of the device. However, in actual use, locking is accomplished in an equivalent single step procedure. Thus, holding sleeve member 3 in one hand and starting with sleeve member 3 and member 1 in the position shown in FIGURE 8, member 2 held in the other hand, is slipped over extension 6 and pin 23 and is given a single counterclockwise twist as far as it will go. The assembly is then in its fully locked position. It will be apparent that this operation is, in effect, the equivalent of the steps outlined in detail above.

While, as shown in the several figures of the drawing, the outside diameters of the principal members 1, 2, and 3 are all the same to provide a coupling of minimum bulkiness, it will be obvious to one skilled in the art that the outside dimensions of the parts are not critical and may be varied as desired to suit any particular purpose.

Having fully described the invention, what is claimed is:

1. A twist-lock coupling comprising:
   (a) A first member comprising a cylinder provided with a plurality of axial slots extending from one end thereof, a circumferential slot extending from the end of each of said axial slots, and an axially-offset circular enlargement at the end of each of said circumferential slots;
   (b) a second member rotatable within said first member;
   (c) a sleeve member rotatable over said first and second members provided with a plurality of axial slots extending from one end thereof and a circumferential slot extending from the end of each of said axial slots; and
   (d) means rigidly secured to said second member positioned to simultaneously engage the slots in said first member and said sleeve member, the circumferential slots in the sleeve member being so positioned as to maintain said rigidly secured means in the axially-offset enlargements of the circumferential slots in the first member.

2. A twist-lock coupling device comprising:
   (a) a first elongated member;
   (b) a second member comprising a cylinder freely rotatable over said first member, said cylinder being provided with a plurality of axial slots, a circumferential slot extending from the end of each of said axial slots, and an axially-offset circular enlargement at the end of each of said circumferential slots remote from the axial slots;
   (c) a sleeve member rotatable over said first and second members provided with a plurality of axial slots and a circumferential slot extending from the end of each of said axial slots, said circumferential slots being enlarged adjacent said axial slots to provide an inclined surface; and
   (d) means rigidly secured to said first member positioned to simultaneously engage the slots in said second member and said sleeve member, the inclined surfaces on the circumferential slots of the sleeve member being so positioned as to force said rigidly secured means into the axially-offset enlargements of the circumferential slots in said second member.

3. A twist-lock coupling device comprising:
   (a) a first elongated member;
   (b) a second member comprising a cylinder freely rotatable over said first member, said cylinder being provided with a plurality of axial slots, a circumferential slot extending from the end of each of said axial slots, and an axially-offset circular enlargement at the end of each of said circumferential slots remote from the axial slots;
   (c) a sleeve member rotatable over and covering parts of said first and second members, said sleeve member being provided with a plurality of axial slots and a circumferential slot extending from the end of each of said axial slots, said circumferential slots extending in a direction opposite to the circumferential slots in said second member and being enlarged adjacent to the axial slots to provide an inclined surface; and
   (d) pin-like members rigidly secured to the first member and extending radially from both sides thereof, said pin-like members being so positioned as to simultaneously engage the slots in said second member and said sleeve member, the inclined surfaces on the circumferential slots of the sleeve member being so positioned as to force said pin-like member into the axially-offset enlargements of the circumferential slots in said second member.

4. A device for coupling rods and the like comprising:

(a) a cylindrical sleeve member provided with a pair of diametrically opposed axial slots extending from one end of said sleeve member and with a circumferential slot extending at right angles from the bottom of each of said axial slots, said circumferential slots being enlarged adjacent the axial slots to provide an inclined surface on the face of each circumferential slot closest to the end of said sleeve member;

(b) a first elongated member provided with a recess at one end thereof for receiving and securing therein a first rod to be coupled, said first elongated member being further provided with an intermediate portion of circular cross section rotatably positioned within the cylindrical sleeve member and with a circular portion of reduced diameter extending axially from said intermediate portion, said portion of reduced diameter extending through and beyond the end of the cylindrical sleeve member, and a pin-like member rigidly secured in and extending radially outward from both sides of said portion of reduced diameter to slidably engage the slots in the cylindrical sleeve member; and (c) a second elongated member provided with a recess at one end thereof for receiving and securing therein a second rod to be coupled, said second elongated member being provided with a cylindrical section of sufficient depth and inside diameter to receive the portion of reduced diameter of the first elongated member and having an outside diameter to freely rotate within the cylindrical sleeve member, said cylindrical section of the second elongated member being provided with a pair of diametrically opposed axial slots extending from the other end of said cylindrical section, with a circumferential slot extending at right angles from the bottom of each of said axial slots, and with an axially-offset circular enlargement at the end of each of said circumferential slots remote from the axial slots, said slots and circular enlargements being of such dimensions as to engage the pin-like member of the first elongated member when said cylindrical section is slipped over the portion of reduced diameter of said first elongated member and into the cylindrical sleeve member, the inclined surfaces on the circumferential slots of the sleeve member being so positioned as to force said pin-like member into said axially-offset enlargements at the ends of the circumferential slots in said second elongated member.

References Cited in the file of this patent

UNITED STATES PATENTS

| | | |
|---|---|---|
| 1,479,583 | Carey | Jan. 1, 1924 |
| 2,060,523 | Packer | Nov. 10, 1936 |
| 2,444,758 | Stillbach | July 6, 1948 |